UNITED STATES PATENT OFFICE.

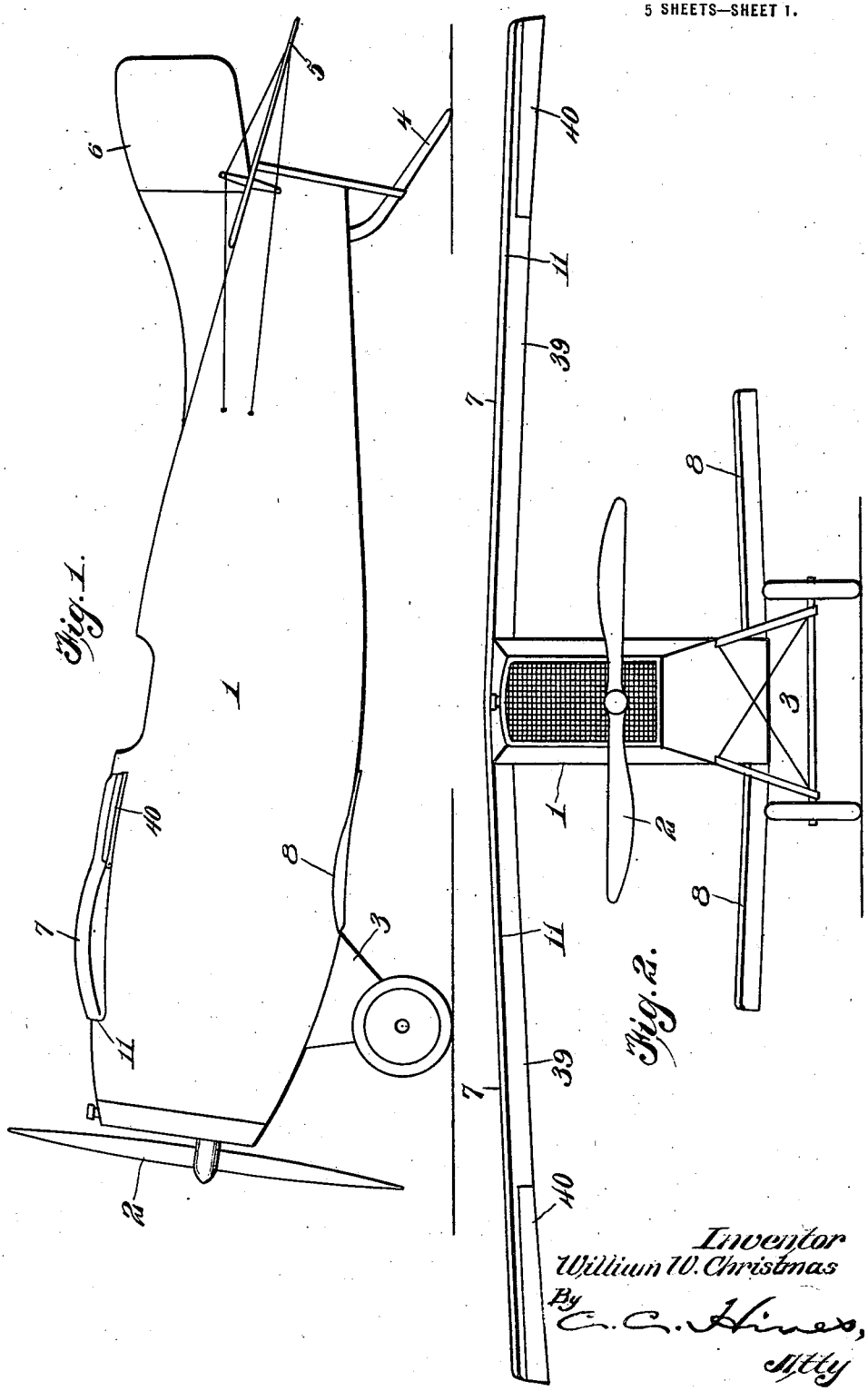

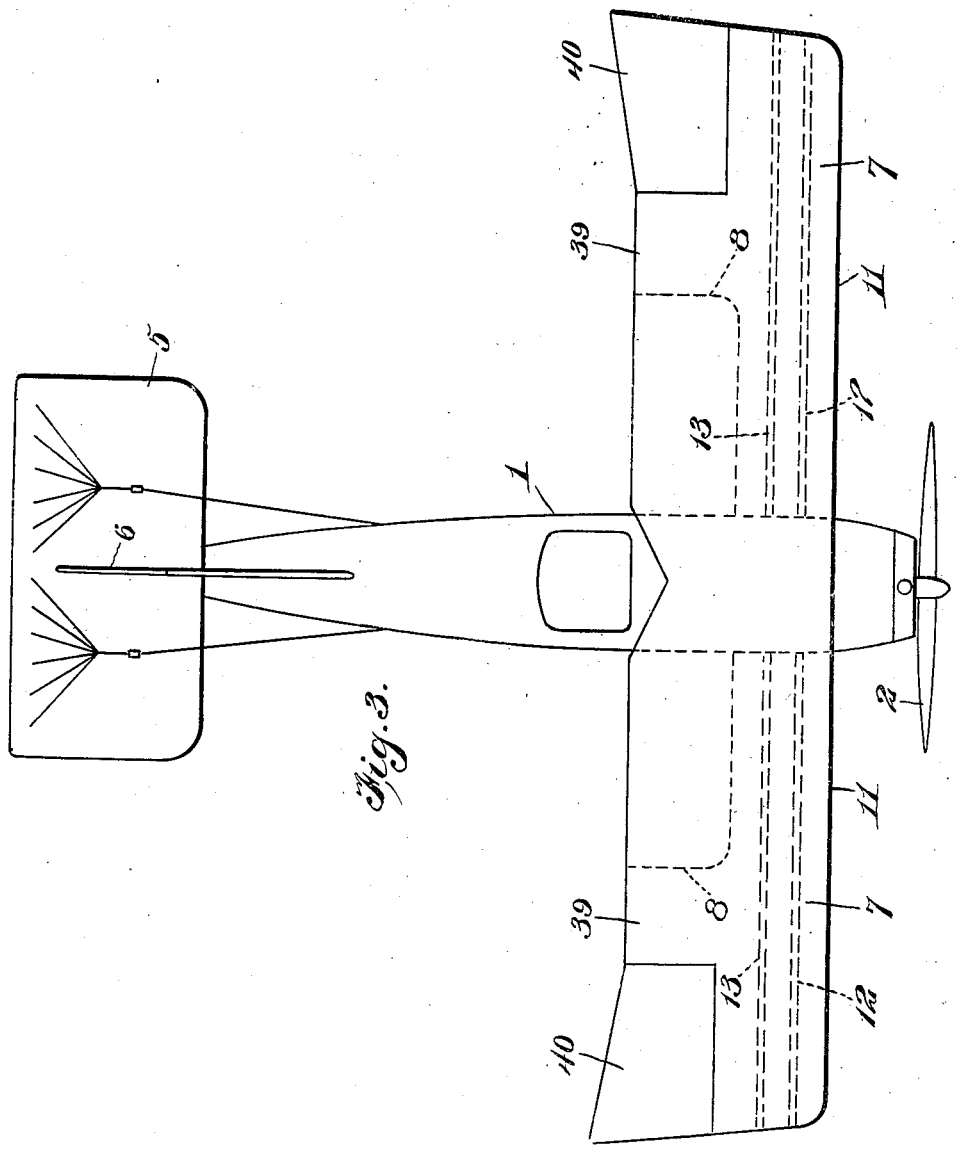

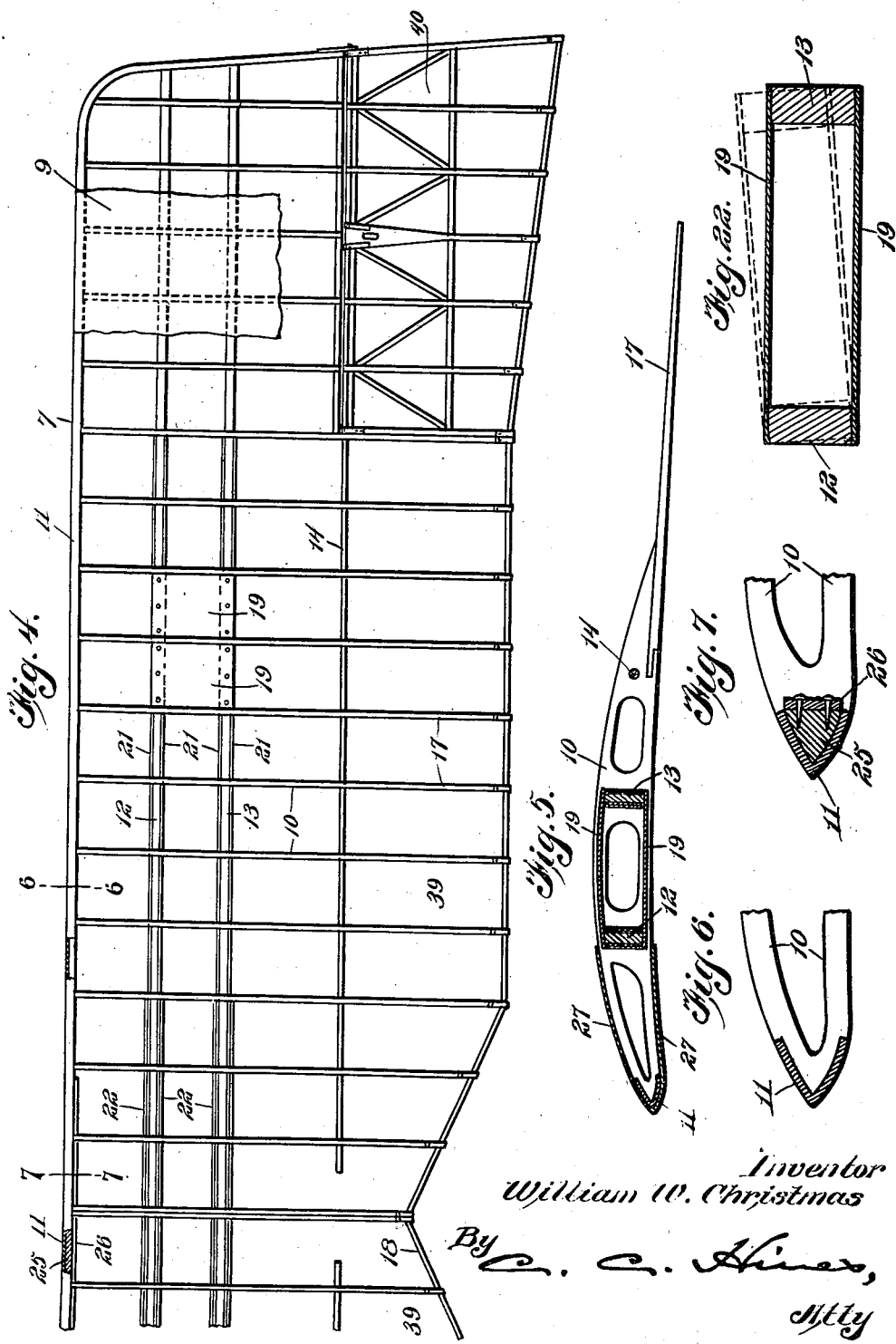

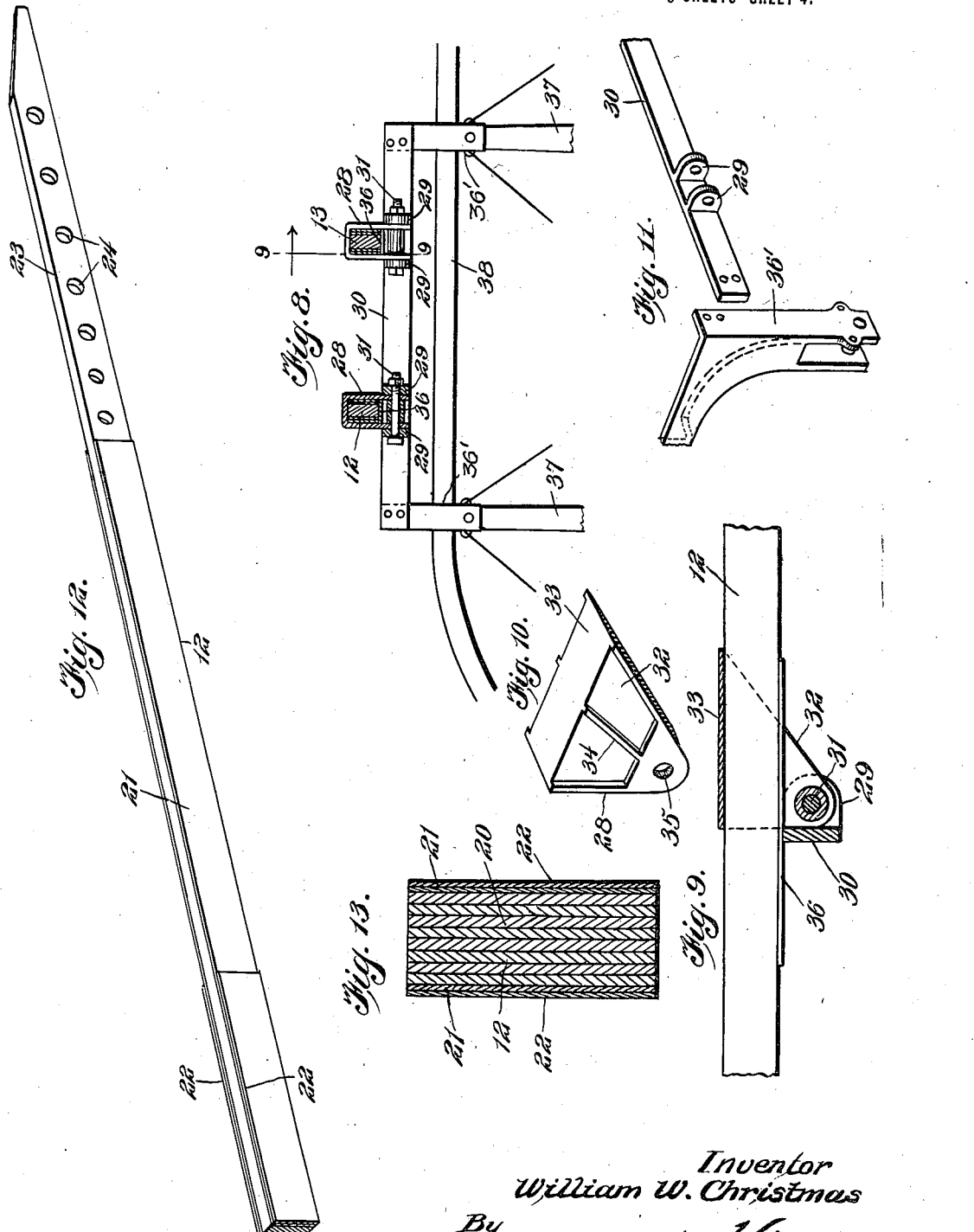

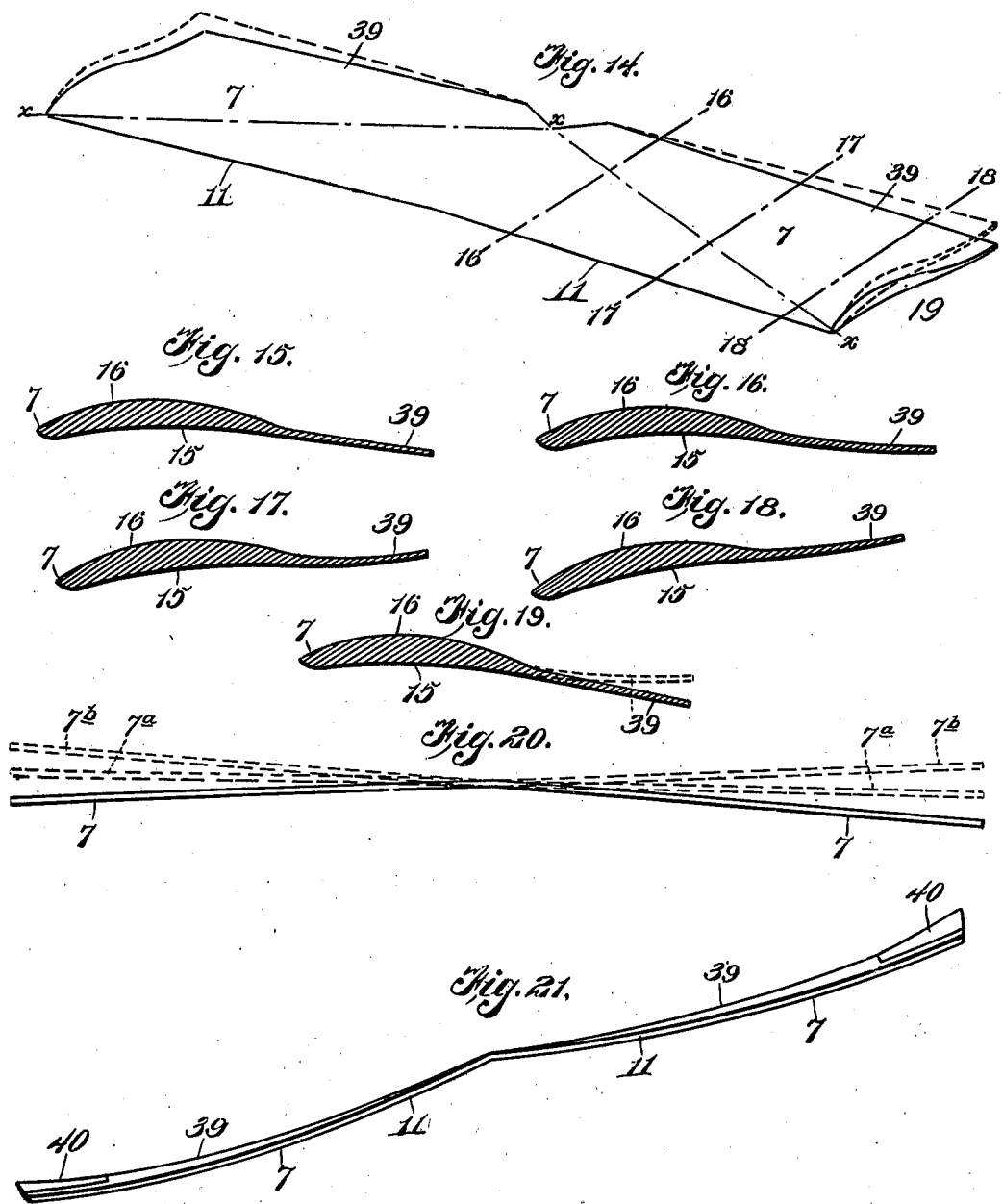

WILLIAM WHITNY CHRISTMAS, OF NEW YORK, N. Y., ASSIGNOR TO CHRISTMAS AEROPLANE COMPANY, INC., OF WASHINGTON, DISTRICT OF COLUMBIA, A CORPORATION OF DELAWARE.

FLYING MACHINE.

1,413,258. Specification of Letters Patent. Patented Apr. 18, 1922.

Application filed February 6, 1919, Serial No. 275,448. Renewed August 22, 1921. Serial No. 494,368.

*To all whom it may concern:*

Be it known that I, WILLIAM W. CHRISTMAS, a citizen of the United States, residing at New York, in the county of New York and State of New York, have invented new and useful Improvements in Flying Machines, of which the following is a specification.

This invention relates to aeroplane construction and more particularly to the construction of the wings forming the supporting surfaces of aircraft of this type, whereby the head resistance is materially reduced, the speed of the craft increased, a high degree of inherent stability and other advantages obtained, and relief from sudden and varying strains secured, such as is impossible with wings of the rigid type.

Flying machines of this character of the types heretofore in use have invariably employed planes or aerofoils of a rigid or non-flexible type, except in such cases where the wings are manually flexed or warped in whole or in part for the purpose of maintaining stability, or where the trailing edges only of the planes are flexible to a restricted degree for a very limited air-shedding action. In all such structures, however, where ailerons or like stability devices are used, which are movable independently of or without flexing the wing body upon itself, the wing body is made as rigid as possible in order to sustain it against collapse under the weight of the load and lift and drift strains falling thereon. Where in such structures the body of the plane or a portion thereof is warped for a stabilizing action, flexibility is provided for in order to secure the warping action through devices under the control of the aviator, but at all other times the wings are held rigidly braced by the controlling devices against flexion under wind pressures. In order to sustain these wings, whether of the rigid or warping type, against collapse when subjected to abnormal stresses or strains, both internal and external braces or supports are employed. The use of internal brace supports as heretofore employed is objectionable on account of their tendency to stretch or loosen under stresses and strains, thus dangerously weakening the wing, and the use of external brace supports in particular results in a loss of efficiency due to rigidity of the structure as well as to the parasitic or head resistance set up thereby.

A vital objection, from the standpoint of aerofoil efficiency, to rigid wings, whether inherently rigid or not, as, in the latter case, in the use of warping wings held rigid in normal or warped position, is that, even when flying in still air, they gather and retain against their reaction surfaces a greater amount of air than is necessary for sustention and push forward a wave of air constantly under compression and of dangerous reactive force. This results not only in comparative instability, but also in a retardation of speed, due to the resistance of all the air retained not necessary for sustention. When a machine is flying in a wind, the undue accumulation of bodies of air, beyond that required for sustention, beneath the wings of the machine results in shocks or jars which dangerously strain the machine and render flight disagreeable and uncomfortable to the aviator and passenger or passengers. Furthermore, in banking a machine with rigid wings a perceptable slam or concussion is felt upon the wings during the banking action, causing shocks or jars which impair the strength of the machine. These objections are to a slight extent overcome in the use of flexible trailing edges which, under the most desirable flying conditions, diminish to a certain extent the abnormal increase of air beneath the wings, but such flexible trailing edges alone are insufficient for the purpose of giving a full and complete air-shedding action to decrease resistance and diminish air pressures and strains upon the wings when the machine is flying in the face of a strong wind or is banking. As a result of the undue retention of air above and beneath the wings, rigid-winged machines also have a loss of efficiency in rapid climbing and range of gliding actions.

The essential and characteristic feature of the present invention resides in the provision of a flexible, shock-absorbing and air-shedding wing, in contradistinction to and a radical departure from the rigid-wing structures heretofore employed. This flexible wing structure possesses, to a very high degree, the shock-absorbing or nullifying actions and air-shedding qualities of the extended wings of a bird or a close simulation of natural bird flight. It also possesses the capability of adjusting itself automatically to different positions under varying wind pressures for the following purposes: (a) to relieve the wing from any material degree of pressure beyond that required for sustention, (b) to maintain stability and secure ease of travel of the craft in light, gusty or heavy winds, and (c) to facilitate banking, alighting and other necessary actions in ordinary or exhibition flying. All strains falling on this wing structure, being either cushioned or warded-off, instead of combatted as with rigid-wing structures, the use of internal wiring or external struts or brace wires may be avoided and a high factor of safety nevertheless maintained, with, at the same time, a material reduction of parasitic resistance. The flexibility of the wing also secures other novel actions and greater aerofoil efficiency than is possible with rigid-winged machines, as hereinafter fully described.

One object of my invention is to provide a wing structure whereby the wing may be extended from the body of the machine and be adapted to withstand all stresses and strains without the use of external supports or bracing, whereby the parasitic resistance will be reduced and the speed of the machine increased.

A further object of the invention is to provide a wing of such structure as to yield, when the pressure of the air falling thereon is greater than that necessary for sustention, in order to permit such excess pressure to shed and relieve the strain upon the wing.

Another object of the invention is to provide a wing structure whereby the wing is adapted to flex and normally shed all excess air up to a certain degree without body motion from a normal flying position, and to shed greater air pressures by a yielding body motion in a vertical plane, and also through a warping action upon itself, to allow the air to spill off and thereby relieve the wing from overstrain, while at the same time preventing the retention beneath the plane of all air tending to retard the speed of the machine.

A still further object of the invention is to provide a wing construction whereby the wings of a plane are adapted to snugly hug the air beneath them, to ensure adequate support under all degrees of density of the atmosphere, and to automatically move to prescribed positions to secure ease of travel of the wings through the air, and to prevent transmission of air pressure shocks or jars to the wings or body of the machine, when the machine is traveling through strong winds or gusts.

A still further object of the invention is to provide a supporting plane composed of wings which will automatically simulate, under the wind pressures thereon, the air-shedding and balancing actions of the extended wings of a flying or soaring bird, and which, in addition to decreasing head resistance and increasing the speed of the machine, will also increase the climbing speed and range of gliding actions of the machine.

A still further object of the invention is to provide a wing structure which may be employed either in monoplane or multiplane machines, and which, when used in multiplane machines, will obviate the necessity of bracing between the planes across the interplane gap, and which will furthermore permit of an easy landing action with a minimum degree of shocks or jars when the machine alights upon the ground.

A still further object of the invention is to provide a flexible wing which will automatically vary its camber proportionate to the speed of the craft to further decrease head resistance.

The invention consists of the features of construction, combination and arrangement of parts hereinafter fully described and claimed, reference being had to the accompanying drawings, in which:—

Figure 1 is a side elevation of a flying machine embodying my invention, shown in the present instance as a machine of the biplane type.

Figure 2 is a front elevation of the machine.

Figure 3 is a top plan view of the same.

Figure 4 is a top plan view, mainly of one of the wings, of the upper supporting plane.

Figure 5 is a vertical section through the wing along the line of the chord.

Figures 6 and 7 are detail sections on the lines 6—6 and 7—7 of Figure 4.

Figure 8 is a vertical longitudinal section through the machine at one side of the fuselage, showing the manner of fastening the wing spars thereto.

Figure 9 is a detail section on line 9—9 of Figure 8.

Figure 10 is a detail view of a spar clamp.

Figure 11 is a fragmentary perspective view of parts of the fuselage to which the upper plane is fastened.

Figure 12 is a perspective view of one of the flexible wing spars.

Figure 13 is an enlarged cross-section through the spar on line 13—13 of Figure 12.

Figure 14 is a perspective view of the upper plane illustrating certain movements of the wing upon itself for air-shedding actions.

Figure 15 is a chord section through the plane with all portions of the plane in normal relative positions.

Figures 16, 17, 18 and 19 are chord sections on lines 16—16, 17—17, 18—18 and 19—19 of Figure 14, showing the varying degrees of amplitude of portions of the plane.

Figure 20 is a diagrammatic front edge view of the plane, illustrating in full lines the normal cathedral angle of the wings and in dotted lines flexing movements of the wings in a vertical plane.

Figure 21 is a similar view illustrating certain movements of the wings, as in a banking action.

Figure 22 is a cross-section through the backbone of the wing, illustrating in dotted lines axial movements of the backbone in a warping action.

In the structure as herein shown, 1 designates a body or fuselage carrying a tractor propeller 2, launching and alighting carriage 3, tail skid 4, and suitably operated horizontal and vertical rudders 5 and 6. The body also carries an upper supporting surface consisting of plane wings 7 and a lower supporting surface consisting of plane wings 8. The structure as thus far described may accord generally with the biplane type of machine illustrated in my prior application filed March 7, 1918, Ser. No. 221,028, in which the upper plane wings and lower plane wings are of a specified arrangement and dimensions, and in which also the upper wings are disposed at a positive or negative angle and the lower wings at a dihedral angle. The invention is not restricted, however, to a biplane type of machine, as the essential principles of the invention may be employed in a triplane or other multiplane type of machine, or in machines of the monoplane type. In the biplane type of machine illustrated the relatively small lower wings 8 are mainly employed to secure certain lifting and stabilizing values, as set forth in my aforesaid prior application, but it will be understood that these lower wings may be dispensed with and the upper wings 7 properly disposed in such event to form a monoplane structure. I shall, therefore, particularly describe my flexible wing structure in its application to the construction of the upper wings, although it is to be understood that the same principle of construction for securing flexibility may be embodied in the lower wings, when it is desired to make such lower wings flexible instead of rigid.

As shown particularly in Figures 4 to 13, inclusive, each wing 7 is composed of a suitable framework encased in a covering 9 of fabric or other suitable material. The framework of the wing consists of spaced ribs 10, a leading edge bar 11, a pair of main wing spars 12 and 13, and a rear resilient wing bar or rod 14. The ribs 10 are properly formed to provide a proper cross sectional contour or curvature between the leading and trailing edges of the wing, which has a concaved or other suitably shaped reaction surface 15 and a convexed or other suitably shaped rarefaction surface 16. The particular shape of these surfaces may vary according to the size of the wing and particular type of machine on which it is employed, but in each instance the shape of the wing will be such as to secure the greatest aerofoil efficiency in the flexing actions of the wing. The wing frame structure above described is completed, with the exception of details hereinafter noted, by the provision of flexible strips 17 extending from and forming continuations of the rear portions of the ribs 10, these strips being made of resilient wood, metal or other suitable material, and all of the strips being suitably connected at their rear ends by a resilient trail bar or rod 18.

In the present instance the wings 7 of the upper plane are shown as being continuous or integral in a unitary structure, forming a one-piece plane which may be conveniently applied to and removed from the fuselage and lashed to the side thereof for convenience in storage or transit, but this construction is not essential, as the wings may be separately formed and applied to the fuselage in any suitable manner. It is preferred, however, to provide a one-piece plane as illustrated for convenience of manufacture and to secure greater strength of construction of the plane as a whole and to facilitate and increase the security of the connection of the wings through the fastening devices to the fuselage.

The front and rear wing spars 12 and 13 are of novel construction, each being, as shown in the present instance, of cantilever type, and these spars are respectively arranged close to and in front and rear of the mean center of pressure of the wing so as to give increased strength to the wing at the points of greatest strain, such spars being adapted to effectually sustain all the lift and drift stresses. These spars are connected at top and bottom by webs or plates 19, of wood, metal or other suitable material, the spars and plates thus forming a cantilever form of box-girder-like backbone or main support for the wing which is of maximum strength and highly resistant to all pressures and strains coming from any direction. This box-girder-like backbone is more or less rigid against movement of the wing in the direction of the line of flight, but is flexible in a vertical plane and also capable of twisting or rotating upon itself as an axis for the purpose of securing certain flexing, body movements and warping actions of the wing, as hereinafter fully described. The spars 12 and 13 may extend through openings in the ribs, which latter are held in spaced relation thereon by the plates 19 which fit between adjacent ribs, other fastening means being also employed if desired to maintain the ribs in proper position. The construction is, however, such that through relative movements of the spars 12 and 13 in a vertical direction the ribs 10, due to their natural elasticity, may bend to a slight but sufficient degree to modify the camber of the reaction surfaces of the body portions of the wings as hereinafter fully set forth.

As shown particularly in Figures 12 and 13, each cantilever wing spar 12 or 13 is of laminated construction, being composed of a plurality of strips or plates 20, formed of wood, metal or other suitable material, strong and elastic wood being preferably employed, said strips being glued or otherwise suitably united. These strips are strengthened and reinforced at proper points by inner metallic strips 21 and outer metallic strips 22. The strips 21 and 22 are made of high grade resilient steel, or other suitable material of a character having both toughness and resiliency and great capacity to bend edgewise without fracture or other injury. The metallic reinforcing strips are parallel with and suitably secured to the wooden strips or laminae, and all of these strips are arranged edgewise perpendicular to the plane of the wing. As a result of this construction it will be obvious that the girder will resist backward movement in the direction of the line of flight under head wind pressures, but will permit bending motions of the wing spars, both in an upward and in a downward direction, the resiliency of the wood and metal laminations permitting vertical movements of the wing spars as described within determined limits, without liability of fracture under determined limits of loads and lift and drift strains imposed thereon.

The flexible wing spars 12 and 13 as thus constructed are preferably made of varying flexibility, and to this end the outer metallic strips are employed only along the inner ends of the bars forming the butt portions of the wings which are secured to the fuselage, while the metallic strips 21 extend outwardly to a point about two-thirds of the length of the wing and there terminate, leaving the extremities of the wing spars devoid of reinforcements, as indicated at 23 in Figure 12. Thus it will be apparent that the wing spars are substantially inflexible at their inner ends or butts, of a certain amplitude of flexibility along the intermediate portions, where they are covered by the plates 21, and of maximum flexibility at their extremities 23. For the purpose of securing lightness of weight and further increasing the flexibility of the extremities 23 of the wing spars, these extremities may be formed with apertures 24. While the wing spars are preferably constructed as described in order to render the wings of varying and progressively increasing flexibility between their inner and outer ends, it is, of course, to be understood that I do not wish to be limited either to the particular construction of the wing spars as set forth for the purpose described or to any particular degree of flexibility of the wing spars, as the construction and degree of flexibility may be varied as required in wings of different spread and to suit other conditions in the adaptation of the invention to wings of different sizes or specifically different types of machines. I also desire it to be understood that while I have described a desirable form and construction of vertically yieldable and warpable main backbone or girder for a flexible wing, any other suitable type of backbone or girder having the same functional qualifications and characteristics may be employed as an equivalent within the spirit and scope of the invention.

In practice, certain details of construction may be resorted to in the production of a wing for a certain type of machine. For instance, the leading edge bar 11 may be grooved upon its inner face to receive the tapered forward ends of the ribs 10, which may be suitably fitted and secured therein, as illustrated particularly in Figure 6. Where the wings are made continuous to provide a one-piece plane, I may also reinforce the grooved bar 11 to certain degrees on opposite sides of the center of the wing by fitting within the groove of the bar 11, between the ribs 10, a filler or fillers 25 to which may be secured a reinforcing strip 26, the filler and reinforcing strip giving increased strength to the leading edge bar against any tendency to separation under strains or stresses on the wings from head wind pressures. Also the forward portion of the wing between the leading edge and flexible girder may be provided with and encased within an inner covering 27 of wood veneer or other suitable material, which will cover the spaces between the forward portions of the ribs and form a smooth backing surface for the outer covering 9, whereby said outer covering will be sustained without impairing the flexibility of the wings as a whole.

As a means for demountably fastening the upper plane in position upon the fuselage, I have shown in the present invention the use, at each side of the fuselage, of clamping stirrups or cuffs 28 which fit down over the wing spars and about the plates 22 and have their side plates fitted at their lower ends between spaced lugs or ears 29 on a longitudinal saddle bar 30, the stirrups and lugs being provided with apertures for the passage of bolts or other suitable fastenings 31. The stirrups 28 are preferably of the form shown in Figures 9 and 10, each having a pair of triangular side plates 32 and a top plate 33, the side plates being provided with reinforcing flanges 34. The perforations 35 in the lower ends of these side plates 32 are arranged at points adjacent the inner vertical edges of said side plates and the top plates 33 are extended outwardly beyond the vertical line of the fastenings so as to reinforce the wing spars in the region of and outwardly beyond their points of attachment to the fuselage to secure increased strength of connection. Washer plates 36 may also be provided beneath the wing spars to rest upon the bar 30 and extend through the stirrup to the wing spar at this point of connection and increasing the strength of the connection. The object of this construction is to provide an extended reinforcing base, in contradistinction to a constricted reinforcing base, to firmly sustain the inner end of the wing at and near the fastening point against stresses and strains under varying wind pressures. The saddle bars 30 are suitably secured to brackets 36' extending transversely of the fuselage and coupling the uprights 37 at the sides of the fuselage to the longérons 38 thereof, thus firmly tying the parts together and rigidly sustaining the saddle bars. While this mode of fastening the wings to the fuselage is desirable and convenient, it is to be understood that any other preferred method may be employed.

It will be observed by reference to Figure 5 that the body portion of the wing 7, formed mainly by the ribs 10 and component parts of the box-girder backbone, is relatively rigid, but, as hereinbefore described, has a certain amplitude of flexibility due to the natural resiliency of the ribs and their capability of flexing vertically upon themselves, or, in other words, flattening out transversely to a limited degree, but that the rear or trailing portions of the wings formed by the strips 17, the flexible rod 18 and the outer covering 9, are free to flex vertically to a much higher degree, or have a materially greater amplitude of flexibility and less resistance to flexion under wind pressures. These strips 17 and component parts of the trail portion of the plane are also relatively flat, or have a less degree of curvature than the relatively stiffer body portion of the wing, and hence a flexible tail vane 39 is provided which is readily and automatically yieldable upwardly under wind pressures and is adapted to return by its own resiliency to normal position when relieved from such pressures. The degree of resistance of the vane 39 is such that it will remain in normal position and retain beneath the reaction surface of the plane a degree of air pressure amply adequate for a supporting action, but when this pressure is exceeded the vane will automatically move upwardly under the excess pressure and permit the same to escape.

In the practical embodiment of the invention in one type of construction I preferably dispose the wings 7 so that they extend laterally from the fuselage 1 and project downwardly and outwardly at a cathedral angle of a certain degree, which may be a negative dihedral of −2 degrees. They may be set at any suitable angle of incidence, say three and one-half degrees. The normal cathedral angle of the wings is illustrated in full lines in Figure 20, the wings being at such angle when the machine is at rest or in a standing attitude under the gravity of the wings, the backbones or girders resisting further downward movement except under depressing wind pressures on the upper surfaces of the wings. In a machine having a wing spread of twenty-eight feet, the wings may have a range of vertical flexibility at their outer ends or tips of three feet, eighteen inches upward and a corresponding amount downward from the normal position shown in full lines in Figure 20. By reason of the construction described, it will be evident that this range of vertical flexibility varies from the butts to the tips of the wings, being nil at the butts and of greatly increasing flexibility toward the tips. When the machine is in flight, the weight of the load and the carrying pressure of the air upon the reaction surfaces of the wings raises the wings from the full line position denoted to the dotted line position 7ª indicated in Figure 7, the machine thus normally flying with the wings in a substantially horizontal or slightly cathedral position. Under increasing wind pressures beyond that required for sustention the wings may move upward to a still further degree, as indicated at 7ᵇ in Figure 20, in which position the wings are set at their limits of upward movement at a positive dihedral angle for certain airshedding and stabilizing actions.

When a machine is in course of flight it is evident that any increase of air beneath the wings beyond that required to actually support the machine in the air is a detriment to speed, since the excess air causes increased head resistance. This objection is overcome with my improved construction of wing due to the fact that, when the pressure beneath the wing increases to a degree beyond that required for sustention, the flexible trailing vane 39 is automatically lifted upwardly to a greater or less degree, dependent upon the amount of the excess pressure, thus allowing the same to wash out or spill off. Hence in the travel of the machine the vane 39 is in a constant state of motion in a vertical plane, the vane moving upwardly to allow the excess air pressure to escape and then returning by its own resiliency to normal position when such pressure is released to confine beneath the wing an adequate amount of air necessary for sustention. As the speed of the craft increases, the amount of air compressed against the reaction surface of the wing progressively increases, and accordingly the vane 39 lifts to a greater or less degree, thus transversely flattening out or reducing the camber of the wing proportionate to the speed of the craft, correspondingly decreasing air resistance and allowing greater speed to be obtained. When the vane 39 is lifted upward to a maximum degree and placed under a certain tension or strain, the pressure thereof upon the relatively stiffer or less flexible body portion of the wing tends to flex such portion of the wing from a normal to a lesser degree of curvature, thus flattening out the wing to a greater or less extent in a fore and aft direction and still further facilitating the wash out action and reducing head resistance and increasing the speed of the craft. By this novel wing action or flexibility of the wing in a fore and aft direction the camber of the plane is automatically varied, while maintaining a high angle of incidence, thus giving a comparatively deep curve for lift when the machine is ascending, descending or traveling at slow speeds and giving a diminished curvature for reduction of resistance when the machine is traveling at high speeds. By the use of an aerofoil curve of known high efficiency upon a flexible wing of my improved construction, the aerofoil efficiency of such a curve is greatly increased as the result of an air-shedding instead of an air retarding action.

As stated, each wing is flexible between its leading and trailing edges for the purpose described, and is also flexible bodily in a vertical plane. Thus it will be understood that when the air pressure beneath either wing is augmented or increased beyond the normal capacity of the flexible trailing vane to wash out or shed the excess air, a resultant upward body movement of the wing to a greater or less degree will occur, changing the angle of the wing from a slightly cathedral or horizontal position to a dihedral position and allowing the air to slide outwardly longitudinally of the wing and spill off at the tip thereof. Thus in flying in strong winds, or when gusts are encountered, the wings may rise under excess pressures and increase the air-shedding action, thus absorbing or warding off the pressures and strains instead of combating and sustaining the full impact thereof, as with rigid-wing structures. Accordingly the machine may be flown in strong or choppy winds without discomfort to the aviator or the transmission of shocks or strains beyond the capacity of the machine to withstand, since the wings will deflect all excess pressures and cushion or absorb the shocks, whereby the strains falling thereon at any time, even in strong winds, will in general be less and at no time greater than those falling upon ordinary rigid wings under much calmer weather conditions. By reference to Figures 19 and 20, the normal wind shedding action of the wing and its increased wind shedding action when the planes bodily move upward will be readily understood. It will be obvious also that the wings may move downwardly under excess wind pressures upon their rarefaction surfaces, thus cushioning the shocks arising from air currents striking the wings from above, the wings resuming their flying position after the excess pressure is shed and maintaining the equilibrium of the craft.

The wings have a still further capability of wind shedding and shock absorbing actions due to their flexibility upon the girder or backbone as an axis of rotation, permitting of the warping of the wing either upwardly or downwardly under air pressures. Owing to the fact that the parts of the girder are of a flexible character, and permit independent vertical motion of the spars 12 and 13 to different degrees, it is evident that the girder or backbone is adapted to warp or twist upon itself, as illustrated, for example, in an exaggerated form, in the sectional view shown in Figure 22. The extent of twisting motion of the girder upon itself varies progressively, from butt to tip of the wing, proportionate to the degree of flexibility of the girder or backbone and to the varying wind pressures, as hereinbefore described. This warping or twisting is due to the up or down pressure or force of the air both forward and rearward of the center of pressure but mainly upon the wing in rear of the spar 13, such portion of the wing accordingly performing the function of a pressure actuated element whose exerted leverage upon the relatively stiffer but flexible girder effects the twisting motion of the girder described. As a result of such twisting motion, the wing, owing to its varying degrees of flexibility between said butt and tip, will be warped at an angle, mainly in the direction of the dotted line $x$—$x$ in Figure 14, thus helicoidally or spirally warping or deforming the plane so that, from its butt toward the rear corner edge of its tip, it partakes of the general form of the blade of a propeller. The excess air pressure thus spills off the wing in a manner similar to the discharge of the slip stream from a propeller blade, with the result of securing instantaneous relief of all excess pressure. It will therefore be apparent that provision is made for a constant wind shedding action under normal winds under ordinary conditions, for an increased wind shedding action when greater air pressures are encountered, and for a still greater release of air pressure in the event that air in still greater volume or pressure is encountered. It will, of course, be apparent that any one or all of these movements may occur in the cushioning and air-shedding actions of the wing, or, in other words, that the wing may flex in a plurality of planes simultaneously, thus providing a structure of such resiliency and shock absorbing qualities as to release all excess air and absorb all strains of flying at various angles and speeds, instead of retaining the air and combating the shocks as occurs in the use of rigid or stiff wings of the ordinary aeroplane wing design. Figure 15 shows the fore and aft contour of the plane when in normal condition, and Figures 16, 17 and 18 are sections taken at different points along the line of one of the wings in Figure 14 and show the varying degrees of warping action which occur at different points along the wing. Figure 19 shows the action of the trail vane in its amplitude of motion in a vertical plane when the plane is flying at comparatively slow speed and in calm atmosphere or ordinary winds.

In a bird's wing there is a substantial inverse concordance in the ratios of air pressure and flexibility along the length of the wing, the pressure being greatest and the flexibility least at the point of juncture of the wing with the body, the pressure least and the flexibility greatest at the tip of the wing, and the pressure gradually decreasing while the flexibility gradually and in substantially like ratio increases from butt to tip of the wing. Hence the wing is strongest and of least flexibility for a distance of from one-fourth to one-half the length of the wing from the body. This constitutes the major lifting portion of the wing, the remainder and more flexible portion being of minor lifting design and intended more particularly for air-shedding, stream-line forming and balancing actions. With such a structure the inferior lifting portion of the wing coacts with the flexible trailing portion to relieve the wing of excessive pressures, and in a pronounced upward movement of the trailing edge the leading edge dips downward, with the effect of decreasing the negative lift and securing a depressing pressure upon the top of the wing during the warping of the wing to relieve the bottom of the wing from abnormal uplifting pressure. In any and all of its various flexing actions the wing furthermore always assumes a streamline form, automatically maintaining a minimum degree of drag or head resistance. It is obvious from the construction and operation described that these actions of a bird's wing are simulated and closely approximated by the type of artificial wing herein disclosed and embodying in such respects the essential principles of my invention. Such flexible artificial wing, unlike a rigid wing, requires no external supports or bracing to sustain it against wind pressures, since, as it absorbs and sheds all excess pressures, the force of the wind is shed or thrown off, instead of rebutted, and the load strains reduced to a degree giving a large safety factor. A rigid wing is often fractured owing to the great leverage extended by a body of air blowing with great and sudden force against the tip of the wing. A similar body of air striking the tip of my improved wing would, on the contrary, be automatically and instantaneously spilled off or washed out, thus relieving the wing from any overstrain.

It will be understood that in the normal travel of the machine the movement of the wings upward from the normal position to the position indicated at $7^a$ in Figure 20 places the wings under spring tension, with a constant tendency to move downward. Hence the wings closely hug the underlying strata of air and give great aerofoil efficiency, and in the event of the momentary passage of either wing over an air hole or thin spot of air the reaction of the wing brings it downward, momentarily compressing the air to maintain the lifting action and the stability of the craft. If, while in course of flight, either wing is struck by a gust of air of any material volume or intensity, the wing immediately yields to the degree necessary to shed the excess amount of air and simultaneously absorbs or cushions the shock, thus preventing excess strains from being transmitted to the wings or body of the craft. Both wings may operate in this manner when struck by gusts from the same or different quarters, and in the flexing action of either or both wings the pressures which would otherwise operate to affect the lateral or longitudinal stability of the craft will be dissipated or dispersed, thus maintaining the craft in a constant state of equilibrium and rendering it unnecessary for the aviator to employ the elevator or ailerons for correcting instability except under most adverse conditions. If the wings are struck by gusts of great intensity, it is apparent that they may move to a pronounced cathedral or dihedral angle and at the same time warp for a maximum wind-shedding action, thus rapidly spilling off or washing out the excess pressure and relieving the wings and body of the machine from the resultant strains, the wings also in this action maintaining, through their angular disposition, the equilbrium of the craft.

In addition to the great flying efficiency and greatly increased speed and inherent stability obtained by the flexing actions of the wings, as above described, it will be understood that as, in strong or gusty winds, the wings are in a constant state of flexion, simulating in such respect the cushioning and wind-shedding functions of the extended wings of a bird, yawing, rolling and pitching motions of the body of the craft will be prevented or restricted or diminished to such a degree that flying in all kinds of winds may be pursued without discomfort or danger to the occupant or occupants of the craft. Also in banking the machine to any degree for turning in a long or short radius, tilting of the body of the craft in the banking action is reduced, as both wings under the pressures falling thereon will move to the dihedral position shown in Figure 20 and simultaneously warp, thus shedding all air beyond that necessary for sustention and to hold the machine against skidding, the wings lifting to the position stated and warping to release the air and then returning to normal position as soon as the bank is formed and the release of the air effected. By this means bank shocks against the wing on the short turning side and dangerous pressures upon the wing on the long turning side will be avoided, the machine turning smoothly and easily and without perceptible shocks or jars, the quick release of the air allowing it to be turned and banked at high speed. It will, of course, be understood that in making a turn one wing may bank and warp to a much greater degree than the other, the action being such as to automatically maintain the stability of the craft at all times and at all positions during the turning action. Hence the wings, while automatically performing the wind-shedding and balancing actions similar to those of the wings of a bird, will at the same time absorb without injury shocks or jars of a degree or intensity much greater than that which may be sustained by any rigid type of wing, making the craft much safer to fly in high winds than aircraft with wings of the ordinary rigid type.

The flexing action of the wings is also of great value in landing the machine at comparatively low speed, in which operation the aviator at the moment of landing turns the nose of the machine sharply upward, thus banking the air strongly beneath the wings. The wind pressure thus banked strongly against the wings instantly reduces the speed of the craft to a safe landing speed, the wings thereupon moving upwardly to a dihedral angle under such pressure and the trailing vane curling upwardly to relieve the wings of shock and permit of the escape of the air, whereby the machine may be landed without shocks or jars and at a comparatively low rate of speed. Owing to the fact that the flexibility of the trail vane provides for the escape of all air beyond that required for sustention, and also for a camber varying action of the wing, it is obvious that the extent of fall of the craft in a given distance of travel by gravity when the power is cut off is greatly reduced over ordinary wing structures, giving the craft a long range of gliding travel with resultant advantage and safety in the event of derangement of the motor.

While, for purposes of illustration, and for disclosure of one type of machine embodying my invention, I have shown and described the wings 7 as being arranged normally at a cathedral (negative dihedral) angle, it is to be understood that the same principle of construction may be employed in a machine in which the wings 7 are arranged normally at a positive dihedral angle, as instanced, for example, in a monoplane construction. The term "dihedral," when employed in a generic sense in the appended claims, is accordingly to be construed as covering an arrangement of wings at either a positive dihedral angle or negative (cathedral angle), while the term "cathedral" is to be construed when used as specifying a particular (negative) dihedral angle.

In the present instance I have shown the use of hinged ailerons 40 upon the wings 7 operable by suitable controlling means for use under certain conditions for maintaining lateral stability, but any other suitable stabilizing devices or means may be employed in lieu thereof.

Having thus fully described my invention, I claim:—

1. A flying machine including a body having wings projecting laterally from opposite sides thereof, said wings being fixed at their inner ends to the body but otherwise free from supporting connection therewith, each wing being inherently resilient for a transverse flexing action and also for a warping action helicoidally upon itself.

2. A flying machine including a body having wings extending laterally from opposite sides thereof, said wings being fixed at their inner ends to the body, each wing being of inherently resilient construction and including a backbone flexible in a vertical plane and adapted to warp or twist upon itself, whereby the plane is adapted under wind pressures to vary its fore and aft contour and to release excess air at all times along the trailing edge thereof and is bodily movable beyond its point of connection with the body in a vertical plane and warpable helicoidally upon itself under strong wind pressures.

3. A flying machine including a body having wings extending laterally from opposite sides thereof, said wings being normally arranged at an angle to the horizontal, each wing embodying an inherently resilient frame flexible in a fore and aft direction and also helicoidally and bodily movable beyond its point of connection with the body in a vertical plane.

4. A flying machine including a body having wings extending laterally from opposite sides thereof, said wings being fixedly secured only at their inner ends to the body, each wing being composed of resilient frame elements including an inherently resilient girder or backbone yieldable in a vertical plane and adapted to warp or twist upon its own axis, said wing being flexible in a fore and aft direction, bodily movable beyond its point of connection with the body in a vertical direction and capable of warping or flexing helicoidally upon itself.

5. A flying machine including a body having wings extending laterally from opposite sides thereof, said wings being fixedly secured only at their inner ends to the body, each of said wings being inherently resilient and comprising a frame embodying ribs having relatively flat flexible trail extensions, and a girder forming a backbone for the wing connecting said ribs, said girder being resilient to permit body movement of the wing beyond its point of connection with the body in a vertical direction and twistable axially to permit the plane to warp helicoidally, and a suitable covering for the wing frame structure cooperating with the resilient rib extensions and forming therewith a tail vane flexible in a vertical plane to vary the fore and aft contour of the wing.

6. A flying machine including a body having wings projecting laterally from opposite sides thereof, said wings being fixedly secured only at their inner ends to the body and each wing comprising a frame structure inherently flexible to a certain degree in a vertical direction and a trail portion of a much greater amplitude of inherent flexibility in a vertical direction, said frame structure consisting of ribs and a resilient backbone connecting the same, said backbone embodying laminated spars arranged in front and rear of the center of pressure of the wing, and connecting means between the spars forming therewith a girder yieldable vertically and to permit the wing to warp helicoidally.

7. In a flying machine, an inherently resilient wing including a framework of ribs, and a girder forming a backbone for the frame to which the ribs are attached, said girder consisting of elements highly resistant to fracture under pressures in a vertical plane but yieldable under such pressures to permit the wing to move bodily upward and downward beyond its point of connection with the body of the machine, said girder being twistable upon itself to also permit the wing to warp helicoidally under wind pressures.

8. In a flying machine, an inherently resilient wing of unitary construction having a flexible trail vane constantly movable in a vertical plane for air-shedding actions, said wing including a framework of ribs, and a girder forming a backbone for the frame to which the ribs are attached, said girder consisting of elements highly resistant to fracture under pressures in a vertical plane but yieldable under such pressures to permit the wing to have body movements beyond its point of connection with the body of the machine in a vertical direction.

9. In a flying machine, an inherently resilient wing of unitary construction having a flexible trail vane constantly movable in a vertical plane for air-shedding actions, said wing including a framework of ribs, and a girder forming a backbone for the frame to which the ribs are attached, said girder consisting of elements highly resistant to fractures under pressures in a vertical plane but yieldable under such pressures to permit the wing to move bodily upward and downward beyond its point of connection with the body of the machine, said girder being twistable upon itself to also permit the wing to warp under wind pressures.

10. In a flying machine, an inherently resilient wing of unitary construction including a framework of ribs, and a girder forming a backbone for the frame to which the ribs are attached, said girder being comparatively rigid in the region of the inner end of the wing and thence being of constantly increasing inherent flexibility toward the outer end of the wing, whereby the wing is rendered bodily yieldable vertically to wind pressures to progressively increasing degrees from the inner toward the outer end thereof.

11. In a flying machine, an inherently resilient wing of unitary construction having a flexible trail vane constantly movable in a vertical plane for air-shedding actions, said wing including a framework of ribs, and a girder forming a backbone for the frame to which the ribs are attached, said girder being comparatively rigid in the region of the inner end of the wing and thence being of constantly increasing flexibility toward the outer end of the wing, whereby the wing is rendered bodily yieldable vertically to wind pressures to progressively increasing degrees from the inner toward the outer end thereof.

12. In a flying machine, an inherently resilient wing having a flexible trail vane constantly movable in a vertical plane for air-shedding actions, said wing including a framework of ribs, and a girder forming a backbone for the frame to which the ribs are attached, said girder being comparatively rigid in the region of the inner end of the wing and thence being of constantly increasing inherent flexibility toward the outer end of the wing, whereby the wing is rendered bodily yieldable vertically to wind pressures to progressively increasing degrees from the inner toward the outer end thereof, said girder also having a capacity of twisting axially upon itself to permit warping of the wing in all directions under wind pressures.

13. In a flying machine, an inherently resilient wing including ribs and a girder uniting the ribs, said girder consisting of spaced spars and reinforcing connections between the spars, the transverse width of said girder being greater than its height.

14. In a flying machine, an inherently resilient wing of unitary construction including a framework of ribs, and a backbone or girder connecting the ribs, said backbone or girder consisting of spaced spars arranged at a distance one from the other in front and rear of the mean center of pressure of the wing, and bracing elements between the spars.

15. In a flying machine, a wing of substantially unitary construction having a framework including ribs, and a resilient backbone or girder connecting said ribs, said backbone or girder consisting of spaced spars consisting of laminæ of different coefficients of elasticity and resistance to fracture, and bracing connections between the spars.

16. In a flying machine, an inherently resilient wing having a framework including ribs and a resilient backbone or girder substantially rectangular in cross-section connecting the same, said backbone or girder consisting of spaced spars each formed of laminated strips of wood and metal, and girder forming bracing connections between the spars.

17. In a flying machine, an inherently resilient wing having a frame including ribs and a backbone or girder being substantially rectangular in cross-section and having its greatest width disposed transversely of the wing and connecting the same, said backbone or girder comprising spaced spars substantially rigid at their inner ends and thence increasing in flexibility toward their outer ends, and connecting elements between the spars forming therewith a girder, said girder being yieldable in a vertical plane and adapted for a twisting motion on its axis.

18. In a flying machine, a resilient wing comprising a body portion having a certain inherent amplitude of flexibility for varying its fore-and-aft contour and a trailing portion having a greater inherent amplitude of flexibility for varying its fore-and-aft contour, said portions of the wing being naturally flexible under increasing wind pressures to vary the overall fore-and-aft contour of the wing to progressively increasing degrees between its leading and trailing edges.

19. In a flying machine, a curved inherently resilient wing adapted to flex under certain air pressures to release air from under the wing and to vary the wing curvature and also bodily movable beyond its point of connection with the body of the machine under certain air pressures in a vertical plane on an axis transverse thereof and to flex upon itself upon an axis longitudinally thereof.

20. In a flying machine, a wing of unitary construction having a body portion comparatively stiff or rigid at its inner end and of gradually increasing flexibility toward its tip, said wing being transversely and inherently flexible and warpable helicoidally upon itself under wind pressures.

21. In a flying machine, a wing having a body portion comparatively stiff or rigid at its inner end and of gradually increasing flexibility toward its tip, said wing being transversely and inherently flexible and having a trailing portion of greater amplitude of flexibility than its body portion, the wing and trailing portion being also inherently warpable helicoidally under wind pressures.

22. In a flying machine, a wing having a body portion comparatively stiff or rigid at its inner end and of gradually increasing flexibility towards its tip, said wing being transversely and inherently flexible and having a trailing portion of greater amplitude of flexibility than its body portion, said wing being bodily movable beyond its point of connection with the body of the machine in a vertical plane and also warpable bodily upon itself along a line diagonally across the wing.

23. A flying machine having wings each including an inherently resilient framework structurally formed to oppose maximum resistance to fracture and at the same time allow of such vertical and transverse deflection and deformation as well as axial twisting of the wing as would be necessary to absorb any shocks of air resistance developing under extraordinary load and strains or such shock-absorbing quality as to prevent the wing structure from collapsing under sudden strains.

24. A flying machine having wings rigidly secured at opposite sides of the body of the machine and extending laterally therefrom, each of said wings including an inherently resilient framework with frame elements set edgewise perpendicularly to the plane of the wing so as to oppose maximum resistance to fracture and at the same time allow of such deflection as would be necessary to absorb any shocks of air resistance developing under extraordinary load and strain or such shock-absorbing quality as to prevent the wing structure from collapsing under sudden strains.

25. In a flying machine, inherently resilient wings connected rigidly at their inner ends only to the body of the machine and extending laterally therefrom, said wings being normally arranged at a dihedral angle and movable yieldingly under air pressures to a reverse dihedral angle, each wing being transversely flexible and having a trailing edge of greater amplitude of flexibility than the body portion thereof, the body portion and trailing edge being universally flexible to permit distortion of the plane helicoidally for a washing out action.

26. A flying machine having wings each of a unitary construction each rigidly secured at their inner ends only and at opposite sides of the body of the machine in a lateral direction therefrom, each of said wings including a framework of inherently resilient or flexible frame elements set edgewise perpendicularly to the plane thereof so as to oppose maximum resistance to fracture and at the same time allow of such deflection as would be necessary to absorb any shocks of air resistance developing under extraordinary load and strain or such shock-absorbing as to prevent the wing structure from collapsing under sudden strains, the intermediate and longitudinal extending frame elements being spaced apart to either side of the center of pressure of the wings and independently connected one with the other with respect to the other of the frame elements.

27. A wing for flying machines comprising an inherently resilient and flexible framework, a box-like girder forming a part of said framework and substantially rectangular in cross-section, said girder having its greatest width disposed horizontally of the wing and having its longitudinal center disposed on the line of the center of pressure of the wing, and a covering enclosing said framework.

28. A wing for flying machines comprising an inherently resilient and flexible framework, a box-like girder forming a part of said framework and substantially rectangular in cross-section, said girder being of a construction substantially rigid at its inner end and progressively resilient and flexible outward from its inner end, said girder having its greatest width disposed horizontally of the wing and having its longitudinal center disposed on the line of the center of pressure of the wing, and a covering enclosing said framework.

29. In a flying machine, an inherently resilient wing including a framework of transversely extending frame elements, and a longitudinally extending frame element, said longitudinally extending frame element comprising a girder to which said transversely extending frame elements are attached, said girder consisting of elements highly resistant to fracture under pressures in a vertical plane but yieldable under such pressures to permit the wing to move bodily upward and downward beyond its point of connection with the body of the machine, said girder being twistable upon itself to also permit the wing to warp helicoidally under wind pressures.

30. In a flying machine, an inherently resilient wing including a framework of transversely extending frame elements, and a longitudinally extending frame element, said longitudinally extending frame element comprising a girder of cantilever form to which said transversely extending frame elements are attached, said girder consisting of elements highly resistant to fracture under pressure in a vertical plane but yieldably under such pressures to permit the wing to move bodily upward and downward beyond its point of connection with the body of the machine, said girder being twistable upon itself to also permit the wing to warp helicoidally under wind pressures.

31. In a flying machine, an inherently resilient wing including a framework of transversely extending frame elements, and a longitudinally extending frame element, said longitudinally extending frame element comprising a girder of cantilever form to which said transversely extending frame elements are attached, said girder consisting of spaced spars each formed of a plurality of layers of material disposed on edge vertically of the wing, and bracing connections between the top edges and the bottom edges of the spars, said girder being highly resistant to fracture under pressure in a vertical plane but yieldable under such pressures to permit the wing to move bodily upward and downward beyond its point of connection with the body of the machine, said girder being twistable upon itself to also permit the wing to warp helicoidally under wind pressures.

In testimony whereof I affix my signature.

WILLIAM WHITNY CHRISTMAS.